F I G. 4
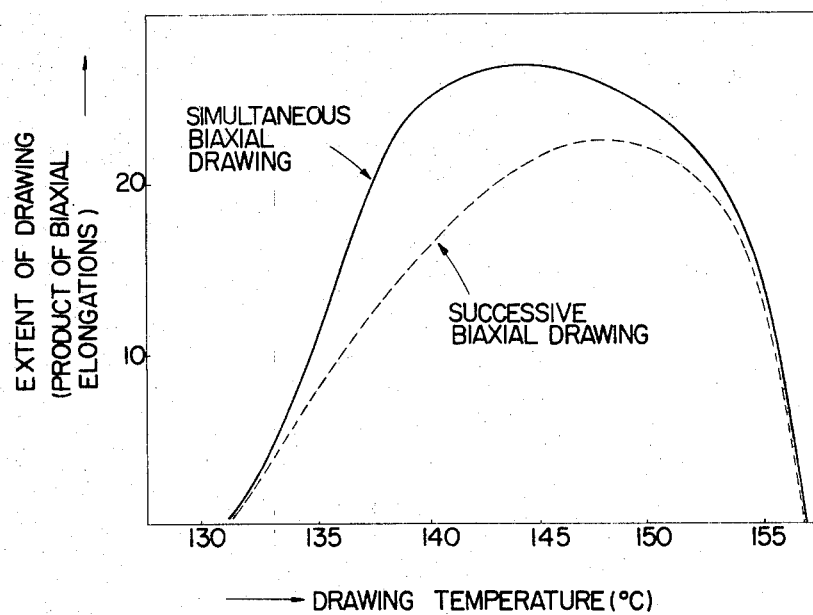

United States Patent Office 3,783,088
Patented Jan. 1, 1974

3,783,088
SYNTHETIC PAPER
Mitsuo Yoshiyasu and Takashi Toyoda, Yokkaichi, Japan, assignors to Kabushiki Kaisha Oji Goseishi Kenkyujo, Tokyo-to, Japan
Filed May 28, 1971, Ser. No. 147,910
Claims priority, application Japan, June 2, 1970, 45/46,933; Aug. 21, 1970, 45/73,216
Int. Cl. B32b 3/26, 19/02
U.S. Cl. 161—160
3 Claims

ABSTRACT OF THE DISCLOSURE

A synthetic-resin film containing from 0.3 to 30 percent by volume of a fine filler is biaxially drawn substantially simultaneously in longitudinal and transverse directions to be expanded at least 5 times in area with a ratio of elongations in the two biaxial directions of from 1:0.25 to 1:4 thereby to form within the film numerous microvoids of a percentage of voids or porosity of at least 10 percent, the ratio of the dimensions of each microvoid in the two biaxial directions being the same as the ratio of elongations therein.

BACKGROUND OF THE INVENTION

This invention relates generally to synthetic papers and more particularly to synthetic papers, each comprising one or more synthetic-resin films, which can be used in the same manner as and for the same purposes as conventional papers of all known categories.

More specifically, this invention relates to new and advanced synthetic papers having greatly improved characteristics and also to an advanced process for producing these synthetic papers in which a base or backing layer and a paper-like layer adhering to at least one surface of the base layer are biaxially drawn thereby to form, in at least the paper-like layer, microvoids of a specific character.

The use of synthetic-resin films having the external appearance and functional characteristics of paper in place of conventional papers of structures comprising various fibers in intertwined state has been proposed. While synthetic papers of this character can be made by rendering synthetic-resin films into papery states, such paperization techniques known heretofore have inevitably been accompanied by certain difficulties.

In view of these difficulties, we have previously proposed synthetic papers consisting of laminated structures as described in: U.S. patent application Ser. No. 809,629, filed on Mar. 21, 1969 (now abandoned) and replaced by continuation-in-part Ser. No. 197,757, filed Nov. 11, 1971, entitled, "Synthetic Papers and Method of Making the Same." More specifically, each of these synthetic papers comprises a substrate or base layer consisting of a biaxially-drawn synthetic-resin film and a paper-like layer consisting of a uniaxially-drawn synthetic-resin film bonded to at least one side of the base layer, the paper-like film containing a fine inorganic filler and having, at the same time, a large number of fine cavities or microvoids.

A laminate structure of this character can be made by laminating a synthetic resin admixed with a filler on at least one surface of a synthetic-resin film previously drawn in the direction of its longitudinal axis to become the base layer and drawing the resulting laminated structure in the direction of the transverse axis. By thus drawing the structure with the filler in this admixed state, fine microvoids are produced in the structure. The paperiness of the paper-like layer is extremely good principally because of the presence of these microvoids.

By this method, furthermore, control of the product thickness is facilitated, and extremely thin products can also be easily produced. Moreover, the existence of a biaxially-drawn film affords mechanical strength necessary for the synthetic paper.

However, even these synthetic papers have been found to have characteristics which need to be improved. One problem is related to the product quality. That is, when inscriptions are printed on the surface of a synthetic paper of the above described character, the printing ink tends to smudge or spread and blur on the surface in some cases depending on the type of ink and on the printing conditions. Furthermore, the paper-like layer in a synthetic paper of this kind has a relatively coarse surface, which requires improvement in cases where smoothness of the surface is highly desirable.

Another problem which requires solution is a problem related to the production process. That is, the production speed of this synthetic paper is determined by the take-up speed (V) of the product in the longitudinal direction, which speed is equal to the product of [the speed of feeding the feed stock sheet to be longitudinally drawn] × [the elongation ratio]. In the case where a resin for the paper-like layer is laminated after the longitudinal drawing of the base layer, this speed (V) cannot be made greater than the laminating speed i.e., the speed at which the laminated structure advances in the longitudinal direction.

However, this laminating speed, e.g., melt-extrusion and laminating speed, cannot be raised to a very high value. As a result, therefore, the production speed of the synthetic paper is subject to limitation imposed by the laminating speed. Accordingly, in the case where high-speed production (for example, 100 meters/minute or higher) of the synthetic paper is required, this restriction becomes a problem which must be solved.

SUMMARY OF THE INVENTION

It is an object of this invention to solve the above described problems and to provide improved synthetic papers by utilizing certain findings we have made as set forth hereinafter.

Another object of this invention is to provide a process for producing these synthetic papers wherein at least one paper-like layer and a base layer are biaxially drawn thereby to form therein microvoids of a specific character.

According to this invention in one aspect thereof, briefly summarized, there is provided a synthetic paper comprising a biaxially-drawn, synthetic-resin film containing from 0.3 to 30 percent by volume of a fine filler of an average particle diameter of the order of from 0.1 to 5 microns, which film comprises at least one layer of a paper-like film having microvoids each of dimensions in longitudinal and transverse directions in a ratio of from 1:0.25 to 1:4 and of a percentage of voids or a porosity of at least 10 percent.

According to this invention in another aspect thereof, there is provided a process for producing synthetic papers of the above described character, which process comprises preparing a synthetic-resin film containing from 0.3 to 30 percent by volume of a fine filler of an average particle diameter of the order of from 0.1 to 5 microns and biaxially drawing this film substantially simultaneously in longitudinal and transverse directions in a manner such that the elongations in the biaxial directions, in terms of film area multiplication, becomes at least 5 times, and that the ratio of elongations in the longitudinal and transverse directions becomes from 1:0.25 to 1:4 thereby to produce microvoids of a percentage of void or a porosity of at least 10 percent within this film.

The nature, principle, and utility of this invention will be more clearly apparent from the following detailed description beginning wih a consideration of general aspects and features of the invention and concluding with specific examples of practice illustrating preferred embodiments of the invention when read in conjunction with the accompanying illustration.

BRIEF DESCRIPTION OF THE ILLUSTRATION

In the illustration:

FIG. 4 is a graphical representation indicating the regions of possible biaxial drawing of single-layer plastic films produced by the process of this invention and by another production process.

DETAILED DESCRIPTION

Figure 1:
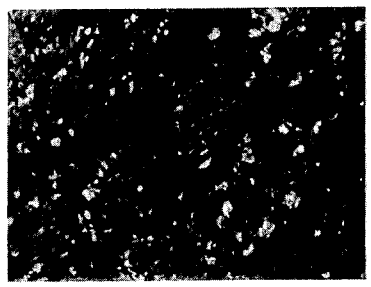
FIG. 1 is a photomicrograph (magnification ×250) taken through an optical microscope of a single-layer, opaque plastic film obtained by the simultaneous biaxial drawing process according to this invention.

A paper-like synthetic-resin film according to this invention as defined hereinabove constitutes, per se, a synthetic paper. However, in accordance with a preferred embodiment of this invention, the synthetic paper has a construction wherein a paper-like synthetic-resin film of this character is caused to adhere to at least one surface of a substrate or base film or a backing film.

Accordingly, a synthetic paper consisting essentially of a base layer and at least one paper-like layer according to a specific example of this invention comprises a base layer consisting of a synthetic-resin film containing from 0 to 8 percent by volume of a fine filler of an average particle diameter of the order of from 0.1 to 5 microns and a paper-like layer adhering to at least one surface of the base layer and consisting of a synthetic-resin film containing from 0.3 to 30 percent by volume of a fine filler of an average particle diameter of the order of from 0.1 to 5 microns, the base layer and at least one paper-like layer being biaxially drawn, and the paper-like layer has minute microvoids of a ratio of dimensions in two orthogonal biaxial directions (for example, longitudinal and transverse) of 1:(0.25 to 4) and a porosity of 10 percent or more.

Furthermore, the process for producing a synthetic paper comprising a base layer and at least one paper-like layer in accordance with a specific embodiment of this invention is characterized by the steps of making a composite sheet structure by laminating a biaxially-drawable, synthetic-resin film which is to become a paper-like layer and contains from 0.3 to 30 percent by volume of a fine filler of an average particle diameter of the order from 0.1 to 5 microns on at least one surface of a biaxially-drawable, synthetic-resin film which is to become a base layer and contains from 0 to 8 percent by volume of a fine filler of an average particle diameter of the order of from 0.1 to 5 microns and drawing this composite sheet structure biaxially in longitudinal and transverse directions in a manner such that the resulting biaxial elongations in terms of multiplication of sheet area become 5 times or more, and the ratio of the elongations in the longitudinal and transverse directions becomes 1:0.25 to 4 thereby to produce minute microvoids with a porosity of 10 percent or more in the resulting paper-like layer.

Thus, a feature of the synthetic paper of this invention is that the microvoids in the paper-like layer have a shape similar to that of a flat tablet or ellipsoid of revolution ranging in planar view from a circle to an elongated ellipse (in which the dimensions in the planar axial directions are in a ratio of 1:4.25 to 4, but that in the height direction is relatively small); that is, the microvoids are substantially isotropic.

This feature was sought and attained in view of our discovery that the principal reason for smudging or blurring of ink in the printed surface of a uniaxially-drawn, paper-like layer previously proposed is the long and narrow shape of the linear microvoids which have almost no thickness and are each formed in the drawing direction with a particle of the filler as a nucleus.

Another advantageous feature of the synthetic papers according to this invention is that they have improved surface smoothness. That is, for example, whereas a previously proposed synthetic paper having a uniaxially drawn layer has a BEK smoothness of 900 seconds, synthetic paper can be produced according to this invention with BEK smoothnesses as high as 3,500 seconds. The mechanical properties of the synthetic paper of this invention in the biaxial or longitudinal and transverse directions are also balanced.

Still another advantageous feature of this invention is that by the production process thereof the speed of the laminating process step merely limits the aforementioned speed of feeding of the feed stock sheet to be longitudinally drawn, whereby the product take-up speed (V) becomes substantially equal to feeding speed of the feed stock sheet multiplied by the elongation in the longitudinal direction.

A further feature of the synthetic paper according to this invention is that, whether it is a single-layer structure or whether it is a laminated structure, the film constituting the paper-like surface is a biaxially drawn film. We have found that when the biaxial drawing of this film is carried out simultaneously, a greater elongation can be attained at a lower temperature.

Accordingly, since biaxial drawing of synthetic resin films containing fillers is difficult, in general, the single-layer synthetic paper of this invention should be biaxially drawn substantially simultaneously. That is, in the case of a synthetic paper of single-layer construction, it may be said that an amply great elongation with an ample filler content can be attained by carrying out simultaneous biaxial drawing.

This advantageous effect of simultaneous biaxial drawing is conspicuously pronounced in single-layer synthetic papers. The reason for this is probably that this effect is not diluted by the presence of a backing film as in the case of a laminated structure. We have found that a paper-like surface produced by simultaneous biaxial drawing is superior to those produced by uniaxial drawing and by successive biaxial drawing in whiteness, opacity, balanced distribution of strength, and uniformity of surface state as indicated in Table 1.

TABLE 1

| Property | Drawing mode | | |
|---|---|---|---|
| | Uniaxial | Successive biaxial | Simultaneous biaxial |
| Strength | Directional | Directional (not directional with special elongation ratio.) | Not directional. |
| Stiffness | do | do | Not directional (higher strength than other modes). |
| Whiteness, opacity | High | Good | Excellent. |
| Surface state | Directional | Generally directional | Isotropic.[1] |

[1] Imparting of directivity also possible.

We have found that by carrying out biaxial drawing, preferably simultaneous biaxial drawing, of a synthetic-resin film containing a filler, it is possible to produce a large number of microvoids, with particles of the filler as nuclei, in the surface and interior regions of the film in directions parallel to the film surface. These microvoids are isotropic. While it is possible to impact directivity by causing the elongation ratios in the two axial directions to differ, the microvoids in this case also will be substantially isotropic.

For this reason, a papery film of low specific gravity is obtained, and the rate of recovery from compression becomes freely adjustable as well as the luster, thickness, and printability. Furthermore, the formability of the film can be easily improved. Accordingly, as we have found in actual practice, the paper-like films according to this invention are suitable for use as papers for various uses as, for example, packaging paper, tracing paper, writing paper, printing paper, poster paper, calendar paper, paper for maps, wallpaper, and labels and for all other uses for paper.

Production of the synthetic paper

The synthetic paper according to this invention has a paper-like surface in the form of a synthetic-resin film which is biaxially drawn and contains a fine filler in the case of single-layer paper structures and also in the case of laminated paper structures. Accordingly, the processes for producing these structures are fundamentally the same, wherefore the following description is present with respect to laminated-structure synthetic papers. The production of single-layer synthetic paper is obvious to a man skilled in the art, provided that he is aware of the fact that the production does not include the step of lamination with a base layer and that simultaneous biaxial drawing is always carried out.

For the base layer of the synthetic paper of this invention, any drawable thermoplastic resin can be used. Specific examples of suitable resins of this character are: polyolefin resins as, for example, homopolymers and copolymers of olefins such as ethylene, propylene, and butane—1; polyamide resins; polyester resins as, for example, polyethylene terephthalate; polyvinyl resins as, for example, homopolymers and copolymers of vinyl chloride; polyvinylidene resins as, for example, homopolymers and copolymers of vinylidene chloride; and homopolymers and copolymers of styrene. Such suitable thermoplastic resins can be used singly or as mixtures of two or more thereof. When necessary, these base-layer resins may contain auxiliary materials such as fillers, stabilizers, plasticizers, and pigments provided that they are in quantities which will not impede or impair drawing.

Of these auxiliary materials, fillers are of particular importance. A filler selected from those described hereinafter can be added in a quantity up to 8 percent by volume of the base-layer resin. We have found that the addition of a filler to the base layer also results in the formation of microvoids in the base layer and thereby produces advantageous effects such as improving the adhesiveness between the base layer and the paper-like layer, widening the temperature range wherein practical drawing is possible toward lower temperatures, improving the foldability of the product, and improving the whiteness of the product. We have found further that the quantity of the filler added to the base layer should be less than that of the filler added to the paper-like layer.

A drawable, thermoplastic resin to be used as the paper-like layer can be selected from among those enumerated hereinabove and may be the same resin as that used for the base layer or a different resin. This resin for the paper-like layer should be one which affords ample adhesive strength when laminated with the base layer. This resin may contain suitable auxiliary additives as in the case of the base-layer resin.

A fine filler is added to this resin for the paper-like layer. While an organic filler such as a powdered resin which is not mutually soluble with the resin for the paper-like layer may be used, an inorganic filler is ordinarily used. Examples of suitable inorganic fillers are clays, talc, asbestos, gypsum, barium sulfate, calcium carbonate, magnesium carbonate, titanium oxide, zinc oxide, magnesium oxide, diatomaceous earth or silicious marl, and silicon oxide. A single kind of inorganic filler or a mixture of two or more kinds can be used. When necessary, one or more organic fillers such as pigments and vegetable fibers can be admixed with this fine filler. One requirement is that the filler be in the form of fine particles, and it is desirable that the filler be heat-resistant.

The content of the fine filler in the resin for the paper-like layer is from 0.2 to 30 percent by volume, preferably from 2 to 25 percent by volume. The term "percent by volume" is herein used to designate a quantity obtained by calculating the volumes of the filler and of the resin respectively from their weights and true specific gravities, the percentage being on the basis of [filler volume]+[resin volume].

In the production of a synthetic paper according to the invention, a biaxially drawable film to become the base layer is first prepared by an ordinary process. The film thickness is ordinarily of the order of at least 20 microns. While this film is ordinarily in an undrawn state, it may be a film which has been subjected to some drawing within the range wherein it can be drawn.

Next, on at least one surface of this biaxially drawable film a resin for a paper-like layer is caused to adhere in laminated state by a suitable known technique such as a calender process involving melting or a melt-extrusion laminating process. An anchor coat used in the extrusion laminating process can be used also for the base-layer film. While the paper-like layer contains a fine filler as described above, it is also possible to decrease the filler content or even not use any filler in the laminated parts near the two lateral edges with respect to the longitudinal direction.

The composite structure thus obtained is then drawn in the biaxial directions (longitudinal and transverse directions). The drawing in the longitudinal and transverse directions can be carried out in either sequence, or simultaneously. This drawing is carried out with drawing ratios or elongations such that the product of the elongations in the longitudinal and transverse directions is 5 times or more, and the ratio of the longitudinal elongation and the transverse elongation is from 1:0.25 to 4, preferably 1:0.5 to 2. The drawing temperature is above the softening temperatures of the resins used and below their melting points.

This biaxial drawing causes the paper-like layer to become white and, at the same time, the base layer and the paper-like layer to acquire a strong adherence therebetween. Moreover, the two layers can be made extremely thin by this biaxial drawing.

In the practice of this invention in this manner, fine microvoids of a ratio of longitudinal versus transverse dimensions of 1:0.25 to 4, preferably 1:0.5 to 2 are formed in the paper-like layer by the above described biaxial drawing, and the porosity of the percentage of voids in the paper-like layer is caused to be 10 percent or higher. The paper-like layer can be caused to acquire these characteristics by appropriately selecting the drawing conditions with respect to the kinds and quantities of the resins and fillers used.

The term "porosity" or "percentage of voids" as herein used is defined as follows $$\frac{(ASG \cdot 1) - (ASG \cdot 2)}{(ASG \cdot 1)} \times 100$$

where:

ASG·1 is the apparent specific gravity prior to formation of microvoids; and

ASG·2 is the apparent specific gravity after formation of voids.

The term "specific gravity" as herein used is that of a resin in the state wherein it contains a filler, irrespective of the time before or after the formation of the microvoids.

After drawing, the material thus drawn is cooled as its drawn state is substantially preserved, and the lateral edges trimmed off, whereupon a synthetic paper according to the invention is obtained. In the case where the lateral edges, that is, the paper-like layer near both lateral edges of the base layer, contains only a small quantity of a filler or no filler at all, the control of the filler content in the starting material resin becomes advantageous in the recovery and reuse of the trimmed off edge material.

A synthetic paper produced in the above described manner can be put directly to use. It is also possible to change the surface characteristics thereof by a further treatment such as, for example, a corona-discharge treatment or an oxidation treatment.

In order to indicate still more fully the nature and utility of the invention, the following examples of practices constituting preferred embodiments of the invention are set forth, it being understood that these examples are presented as illustrative only, and that they are not intended to limit the scope of the invention.

EXAMPLE 1

Samples A, B, and C were prepared by admixing respectively 3 parts of diatomaceous earth of average particle diameter (APD) of 4 microns, a clay of APD of 1 micron, and calcium carbonate of APD of 0.6 micron to 97 parts of an isotactic polypropylene of a melt index (MI) of 1. The samples thus prepared were heated, kneaded, and granulated separately by means of an extruder set at a temperature of 250° C. thereby to produce filler-admixed materials, which were then extruded through the die or casting slit of the extruder set at 250° C. and then cooled to a temperature below 40° C., whereupon undrawn sheets of 0.5 mm. thickness were obtained.

Each of the three undrawn sheets thus obtained was heated to 140° C. and subjected to simultaneous biaxial drawing 5 times in the longitudinal direction and 5 times in the transverse direction and was then directly cooled in the as-drawn state. Thereafter, the lateral edges were trimmed off.

Figure 2:
FIGS. 2 and 3 are smilar photomicrographs (magnification ×250) of single-layer, opaque plastic films obtained by other production processes.

The filler-containing films A, B, and C thus produced were opaque, and each was found to have a large number of substantially uniform circular microvoids about respective particles of the filler as indicated in the photomicrograph of FIG. 1. Each of these films was found to be superior in opacity and mechanical properties (including stiffness) than a film having microvoids of elliptical shape about respective particles of a filler as in the case a film successively biaxially-drawn with equal elongations in the two axes, as shown in FIG. 2.

The differences in opacity (percent, as determined according to Japanese Industrial Standards, JIS P-8138, Method for Testing Opacity of Paper) due to difference between these drawing methods are indicated in Table 2.

g./cc.) of a MI of 0.9, 15 parts of an isotactic polypropylene of a MI of 1.0, 20 parts of [Celite] (trademark) of an APD of 4 microns, and 3 parts of titanium oxide of an APD of 0.3 micron were mixed. The resulting mixture was heated, kneaded, and granulated by means of an extruder set at a temperature of 220° C. The resulting granulated, filler-admixed material was extruded through the die of the extruder set at 220° C. and cooled by a cooling device to a temperature below 50° C., whereupon an undrawn sheet of 0.6 mm. thickness was obtained.

This undrawn sheet was heated in an oven at 140° C. and subjected to simultaneous biaxial drawing 5 times in each of the longitudinal and transverse directions. The sheet was cooled in the as-drawn state, and the lateral edges thereof were trimmed off.

The filler-containing film thus produced had a specific gravity of 0.8 and was found to contain substantially uniform microvoids of circular shape formed about respective particles of the filler as nucleuses the surface of the film being similar to that of the preceding Example 1 as shown in FIG. 1. This film was found to have an opacity and whiteness superior to those of a successively and biaxially drawn film of the same elongation ratios and to have a writability, paperiness, stiffness, and printability comparable to or superior to those of conventional papers.

EXAMPLE 3

The region wherein biaxial drawing is possible with above described undrawn sheet was measured, whereupon the result as indicated in FIG. 4 was obtained.

In carrying out this measurement, the extent of drawing (as expressed by the product of the elongations in the biaxial directions) was increased at a certain constant temperature until a limit is reached above which the sheet ruptures and can no longer be drawn. The rate at which the film was drawn in this example was 1,500 percent/minute. By repeating this measurement at various temperatures, a curve indicating the variation of the limiting extent of drawing with temperature was obtained, the region below this curve being the above mentioned region of possible biaxial drawing.

Such curves were determined respectively for a film produced by simultaneous biaxial drawing and a film produced by successive biaxial drawing as shown in FIG. 4.

As is apparent from FIG. 4, the region of possible biaxial drawing is greater in the case of the film produced by simultaneous biaxial drawing. It is also apparent that a higher extent of drawing is possible particularly at lower temperatures, whereby the effects due to drawing, such as improvement of whitening, opacity, stiffness, strength, and uniformity of thickness of the film, are caused to become even more pronounced.

53 parts of a high-density polyethylene (density 0.96 g./cc.) of a MI of 0.9, 24 parts of a polystyrene of a

TABLE 2.—OPACITY

| Drawing method | Kind of filler | Elongation, percent | | | |
|---|---|---|---|---|---|
| | | Undrawn | 3 x 3 | 4 x 4 | 5 x 5 |
| Simultaneous biaxial | (A) Diatomaceous earth | 2.6 | 55 | 60 | 58 |
| | (B) Clay | 2.5 | 23 | 30 | 58 |
| | (C) Calcium carbonate | 2.3 | 45 | 56 | 56 |
| Successive biaxial | (A) Diatomaceous earth | 2.6 | 50 | 55 | 56 |
| | (B) Clay | 2.5 | 18 | 25 | 46 |
| | (C) Calcium carbonate | 2.3 | 44 | 47 | 50 |

Figure 3:
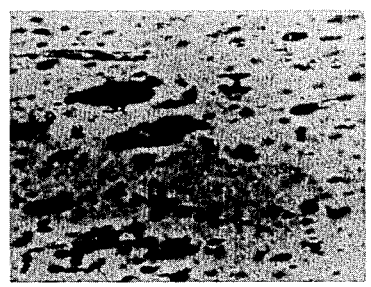

FIG. 3 is a photomicrograph of an uniaxially drawn film in which long and narrow microvoids have been formed about respective particles of a filler.

EXAMPLE 2

62 parts of a high-density polyethylene (density 0.96 g./cc.) of a MI of 0.9, 15 parts of an isotactic poly- $[\eta]=1.5$ in toluene at 25° C., 20 parts of [Celite] of an APD of 4 microns, and 3 parts of titanium oxide of an APD of 0.3 micron were mixed and were then heated, kneaded, and granulated by means of an extruded set at a temperature of 210° C. The filler-admixed material thus granulated was extruded through the die of the extruder maintained at 210° C. and then cooled to a temperature below 50° C. by a cooling device, whereupon an unknown sheet of 0.6 mm. thickness was obtained.

This undrawn sheet was heated in an oven maintained at 135° C. and simultaneously biaxially drawn 5 times in each of the biaxial directions. The film was then cooled in its as-drawn state, and the lateral edges thereof were trimmed off.

The filler-containing film produced in this manner had a specific gravity of 0.85 and was found to have properties similar to those of the sheet of Example 2.

The tensile strength (according to JIS Z–1702) and the stiffness (according to TAPPI, T451) of the each of the films produced in accordance with Examples 2 and 3 were measured, whereupon the results indicated in Tables 3 and 4 were obtained. Successive biaxial drawing was perature below 40° C. by a cooling device, whereupon an undrawn sheet of a thickness of 0.3 mm. was obtained.

Separately, 25 percent by volume of the above mentioned clay was admixed with a polypropylene of a MI at 4.0 to form a mixture which was granulated in the above described manner and extruded by an extruder set 250° C., the granulated material being extrusion laminated on both surfaces of the previously prepared undrawn sheet.

The laminated, undrawn sheet thus prepared was drawn in the longitudinal and transverse directions to produce the elongations indicated in Table 5 and then cooled in the as-drawn state. The lateral edges were then trimmed off, and the resulting sheet was taken up. The resulting filler-containing film was found to have excellent opacity and whiteness and paper-like characteristics including good writability.

TABLE 5

| Elongation (biaxial) | Apparent specific gravities | | | porosity, paper-like layer (percent) | Balance of mechanical strength | | Whiteness | Opacity | Remarks |
|---|---|---|---|---|---|---|---|---|---|
| | Laminated sheet | Base layer | Paper-like layer | | Stiffness ratio (long./trans.) | Tensile stength ratio (long./trans.) | | | |
| 2 x 10 | 0.77 | 0.90 | 0.64 | 45 | 0.34 | 5.8 | 89 | 90 | Unidirectional widening of printed lines. |
| 2 x 2 | 0.95 | 0.90 | 1.00 | 7 | 0.96 | 1.2 | 84 | 65 | Almost no line widening. |
| 1.5 x 6 | 0.90 | 0.90 | 0.90 | 16 | 1.0 | 1.5 | 87 | 76 | Do. |
| 2 x 6 | 0.84 | 0.90 | 0.78 | 28 | 0.52 | 3.4 | 88 | 83 | No line widening whatsoever. |
| 4 x 4 | 0.80 | 0.90 | 0.70 | 36 | 0.89 | 1.1 | 88 | 85 | Do. |
| 5 x 5 | 0.76 | 0.90 | 0.62 | 44 | 0.85 | 1.2 | 89 | 90 | Do. |
| 7 x 7 | 0.71 | 0.90 | 0.51 | 55 | 0.90 | 1.2 | 89 | 91 | Do. |
| 5 x 12 | 0.69 | 0.90 | 0.49 | 57 | 0.56 | 3.1 | 89 | 91 | Do. | carried out by drawing first in the longitudinal direction and then in the transverse direction.

TABLE 3.—TENSILE STRENGTH
[Unit: kg./mm.²]

| | Drawing mode | | | |
|---|---|---|---|---|
| | Simultaneous biaxial | | Successive biaxial | |
| | Longitudinal | Transverse | Longitudinal | Transverse |
| Sample: Example: | | | | |
| 2 | 610 | 534 | 300 | 570 |
| 3 | 580 | 613 | 574 | 667 |

TABLE 4.—STIFFNESS

| | Drawing mode | | | |
|---|---|---|---|---|
| | Simultaneous biaxial | | Successive biaxial | |
| | Longitudinal | Transverse | Longitudinal | Transverse |
| Sample: Example: | | | | |
| 2 | 8.1 | 8.1 | 5.4 | 2.1 |
| 3 | 6.0 | 6.0 | 4.0 | 6.2 |

It is apparent from these results that simultaneous biaxial drawing produces films of higher strength and stiffness and better balanced strengths in the biaxial directions than successive biaxial drawing.

EXAMPLE 4

To a polypropylene (crystallinity of 95 percent) of a MI of 0.8, 2 percent by volume of a clay of an APD of 3 microns was admixed, and the resulting mixture was heated, kneaded, and granulated by means of an extruder maintained at 250° C. The filler-admixed material thus granulated was extruded through the die of the extruder maintained at 250° C. and then cooled to a tem-

EXAMPLE 5

A polypropylene (crystallinity of 95 percent) of a MI of 0.8 was extruded through the die of an extruder maintained at 250° C. and then cooled to a temperature below 40° C. by a cooling device, whereupon an undrawn sheet of 0.3 mm. thickness was obtained.

Separately, a clay (APD of 3 microns) was admixed in the quantities indicated in Table 6 to a polypropylene of a MI of 4.0, and each of the resulting mixture was heated, kneaded, and granulated by means of an extruder maintained at 250° C. Each filler-admixed material thus granulated was melt-extruded through the die of the extruder maintained at 250° C. and melt-laminated on both surfaces of the previously prepared undrawn sheet.

Each laminated, undrawn sheet thus obtained was drawn simultaneously in the longitudinal and transverse directions and then cooled in the as-drawn state. The lateral edges were then trimmed off, and the sheet was taken up. The porosities of these sheets and their apparent specific gravities (in parentheses) were as set forth in Table 6.

TABLE 6.—POROSITY, AND APPARENT SPECIFIC GRAVITY IN PARENTHESES

| | Clay content | |
|---|---|---|
| Biaxial elongation (times) | 2% by volume | 30% by volume |
| 1 x 1 | 0 (0.925) | 0 (1.21) |
| 3 x 3 | 10.3 (0.83) | 48 (0.62) |
| 4 x 5 | 16 (0.78) | 58 (0.50) |
| 5 x 6 | 21 (0.73) | 63 (0.45) |

What is claimed is:

1. A synthetic ink receptive paper comprising a synthetic-resin porous film biaxially drawn in longitudinal and transverse directions and containing from 0.3 to 30 percent by volume of a uniformly dispersed fine filler of an average particle diameter of the order of from 0.1 to 5 microns, containing uniformly dispersed microvoids of substantially circular section, each microvoid enclosing each particle of said filler and extending through the surface and each having a ratio of dimensions in said longitudinal and transverse directions in a range of from 1:0.25 to 1:4, the porosity resulting from said voids of said film being at least 10 percent.

2. A synthetic ink receptive paper comprising a base layer and at least one porous paper-like layer, said base layer comprising a synthetic resin containing from 0 to 8 percent by volume of a fine filler of an average particle diameter of the order of from 0.1 to 5 microns, said porous paper-like layer comprising a synthetic-resin film containing from 0.3 to 30 percent by volume of a uniformly dispersed fine filler of an average particle diameter of the order of from 0.1 to 5 microns and adhering to at least one surface of the base layer, said base layer and said paper-like layer having been biaxially drawn in longitudinal and transverse directions, the paper-like layer having uniformly dispersed microvoids of substantially circular section each microvoid enclosing each particle of said filler and each having a ratio of dimensions in said longitudinal and transverse directions in a range of from 1:0.25 to 1:4, and the porosity resulting from said voids of said paper-like layer extending through the surface and being at least 10 percent.

3. A synthetic paper as claimed in claim 2 in which the synthetic resins for the paper-like layer and the base layer are members selected from the group consisting of isotactic polypropylenes, polyethylenes, and mixtures of at least two thereof.

References Cited
UNITED STATES PATENTS

| | | | |
|---|---|---|---|
| 3,154,461 | 10/1964 | Johnson | 161—402 X |
| 3,515,626 | 6/1970 | Duffield | 161—168 X |
| 3,627,625 | 12/1971 | Hitchin | 161—168 X |

WILLIAM A. POWELL, Primary Examiner

U.S. Cl. X.R.

156—77, 229; 161—162, 165, 168, 402; 264—291